United States Patent
Yamada et al.

(10) Patent No.: US 11,384,864 B2
(45) Date of Patent: Jul. 12, 2022

(54) VACUUM PRESSURE PROPORTIONAL CONTROL VALVE

(71) Applicant: CKD CORPORATION, Komaki (JP)

(72) Inventors: Yoshiyuki Yamada, Komaki (JP); Shunsuke Umezawa, Kasugai (JP)

(73) Assignee: CKD CORPORATION, Komaki (JP)

( * ) Notice: Subject to any disclaimer, the term of this patent is extended or adjusted under 35 U.S.C. 154(b) by 365 days.

(21) Appl. No.: 16/747,711

(22) Filed: Jan. 21, 2020

(65) Prior Publication Data
US 2020/0248685 A1 Aug. 6, 2020

(30) Foreign Application Priority Data
Feb. 4, 2019 (JP) .............................. JP2019-017803

(51) Int. Cl.
| | |
|---|---|
| *F16K 31/122* | (2006.01) |
| *F16K 51/02* | (2006.01) |
| *F04C 14/18* | (2006.01) |
| *F16K 27/07* | (2006.01) |
| *F16K 27/00* | (2006.01) |

(Continued)

(52) U.S. Cl.
CPC ............ *F16K 51/02* (2013.01); *F04C 14/185* (2013.01); *F16K 27/00* (2013.01); *F16K 27/07* (2013.01); *F04C 13/005* (2013.01); *F16K 31/1221* (2013.01); *F16K 99/0015* (2013.01)

(58) Field of Classification Search
CPC ...... F16K 1/523; F16K 27/02; F16K 31/1221; F16K 51/02
See application file for complete search history.

(56) References Cited

U.S. PATENT DOCUMENTS

| | | | | |
|---|---|---|---|---|
| 4,744,386 A | * | 5/1988 | Frazer | ................. F16K 31/1221 137/315.31 |
| 7,357,368 B2 | * | 4/2008 | Takeda | ................. F16K 31/143 251/60 |

(Continued)

FOREIGN PATENT DOCUMENTS

| | | |
|---|---|---|
| CN | 101410620 A | 4/2009 |
| DE | 4023845 C1 * | 4/1992 |

(Continued)

OTHER PUBLICATIONS

Nov. 2, 2021 Office Action issued in Japanese Patent Application No. 2019-017803.

*Primary Examiner* — Hailey K. Do
(74) *Attorney, Agent, or Firm* — Oliff PLC

(57) ABSTRACT

A vacuum pressure proportional control valve placed on a pipe connecting between a reaction vessel and a vacuum pump to control the vacuum pressure in the reaction vessel includes a cylinder provided with a piston chamber, a piston housed in the piston chamber so as to make reciprocal linear movement, a valve seat surface, and a valve element which contacts with or separates from the valve seat surface according to the movement of the piston. A stopper member is provided in the cylinder so that a leading end portion of the stopper member is placed in the piston chamber. The stopper member is configured to move the piston back and forth in a moving direction of the piston by use of an adjusting unit to thereby adjust the position of the leading end portion.

12 Claims, 10 Drawing Sheets

(51) Int. Cl.
*F04C 13/00* (2006.01)
*F16K 99/00* (2006.01)

(56) References Cited

U.S. PATENT DOCUMENTS

| | | | |
|---|---|---|---|
| 2004/0007682 A1* | 1/2004 | Kajitani | F16K 31/1221 |
| | | | 251/63.6 |
| 2005/0045839 A1 | 3/2005 | Kajitani | |
| 2006/0191777 A1* | 8/2006 | Glime | F16K 31/1225 |
| | | | 200/81 R |
| 2008/0111095 A1* | 5/2008 | Naitoh | F16K 51/02 |
| | | | 251/335.3 |
| 2009/0183786 A1 | 7/2009 | Iwa et al. | |
| 2013/0313458 A1 | 11/2013 | Kouketsu et al. | |
| 2014/0346385 A1* | 11/2014 | Hasunuma | F16K 31/506 |
| | | | 251/278 |
| 2017/0030476 A1* | 2/2017 | Taya | F16K 1/126 |
| 2019/0247881 A1* | 8/2019 | Levins | B05C 5/0225 |

FOREIGN PATENT DOCUMENTS

| | | |
|---|---|---|
| JP | 2005-076829 A | 3/2005 |
| JP | 2015-178896 A | 10/2015 |
| TW | 201233929 A | 8/2012 |

\* cited by examiner

VACUUM PRESSURE PROPORTIONAL CONTROL VALVE

CROSS-REFERENCE TO RELATED APPLICATIONS

This application is based upon and claims the benefit of priority from the prior Japanese Patent Application No. 2019-017803 on Feb. 4, 2019, the entire contents of which are incorporated herein by reference.

BACKGROUND

Technical Field

The present disclosure relates to a vacuum pressure proportional control valve disposed on a pipe connecting a reaction vessel and a vacuum pump and configured to control vacuum pressure in the reaction vessel.

Related Art

A semiconductor manufacturing equipment is configured such that various fluid control devices are connected to a reaction vessel via pipes in order to accurately control the flow rate and the pressure of various kinds of gasses to be supplied to or discharged from the reaction vessel to enhance the product quality. One of those fluid control devices is a vacuum pressure proportional control valve.

This vacuum pressure proportional control valve is placed on a pipe connecting a reaction vessel and a vacuum pump. At the start of exhaust, the vacuum pressure proportional control valve regulates exhaust gas to a minute flow rate so as not to stir up particles. When the inner pressure of the reaction vessel becomes sufficiently low, the vacuum pressure proportional control valve is then fully opened to control exhaust gas flow to a high flow rate. See Japanese unexamined patent application publication No. 2015-178896, for example.

SUMMARY

Technical Problems

However, the conventional arts have the following problems. Specifically, the vacuum pump is installed in various places, such as the floor below a floor in which the reaction vessel is installed, according to the layout of devices arranged around the reaction vessel or other factors. Thus, the length of the pipe connecting the vacuum pump and the reaction vessel differs depending on the configuration of the semiconductor manufacturing equipment. For example, the length of the pipe may be 2 m to 3 m or 30 m to 50 m. The longer the pipe, the pressure loss generated in the pipe is increased, accordingly. This deteriorates exhaust characteristics for exhausting gas from the reaction vessel.

In recent years, moreover, a vacuum pump with high pumping power is often used to shorten the exhaust time to thereby enhance the productive efficiency of semiconductors. For example, the pumping power of a vacuum pump has been improved from 50000 L/min to 150000 L/min. However, even if the vacuum pump can provide such a high pumping power, the exhaust characteristics may deteriorate unless pressure loss which may occur in the pipe is improved.

Any conventional vacuum pressure proportional control valves would not be provided with a mechanism for adjusting the stroke (the full stroke) during full opening. Thus, even when the conventional vacuum pressure proportional control valve is installed on a pipe of 2 m to 3 m or on a pipe of 30 m to 50 m, this valve only provides a fixed full stroke and could not change the exhaust characteristics.

The present disclosure has been made to address the above problems and has a purpose to provide a vacuum pressure proportional control valve capable of changing exhaust characteristics.

Means of Solving the Problems

To achieve the above-mentioned purpose, one aspect of the present disclosure provides a vacuum pressure proportional control valve to be placed on a pipe connecting a reaction vessel and a vacuum pump to control vacuum pressure in the reaction vessel, the vacuum pressure proportional control valve comprising: a cylinder including a piston chamber; a piston housed in the piston chamber so that the piston makes reciprocal linear movement; a valve seat; a valve element configured to contact with or separate from the valve seat according to movement of the piston; a stopper member placed in the cylinder and including a leading end portion placed inside the piston chamber, the stopper member being configured to place the vacuum pressure proportional control valve in a fully-open state when the leading end portion contacts with the piston; and an adjusting unit configured to move the stopper member back and forth in a moving direction of the piston to adjust a position of the leading end portion.

According to the vacuum pressure proportional control valve configured as above, using the adjusting unit to move back and forth the stopper member in the axial direction to thereby adjust the full stroke, the exhaust characteristics can be changed according to a change in length of a pipe that connects the reaction vessel and the vacuum pump and a change in pumping power of the vacuum pump.

According to the present disclosure, a vacuum pressure proportional control valve capable of changing the exhaust characteristics can be achieved.

DETAILED DESCRIPTION OF THE EXEMPLARY EMBODIMENTS

A detailed description of embodiments of a vacuum pressure proportional control valve according to the present disclosure will now be given referring to the accompanying drawings.

First Embodiment (Schematic Configuration of Vacuum Pressure Proportional Control Valve)

Figure 1:
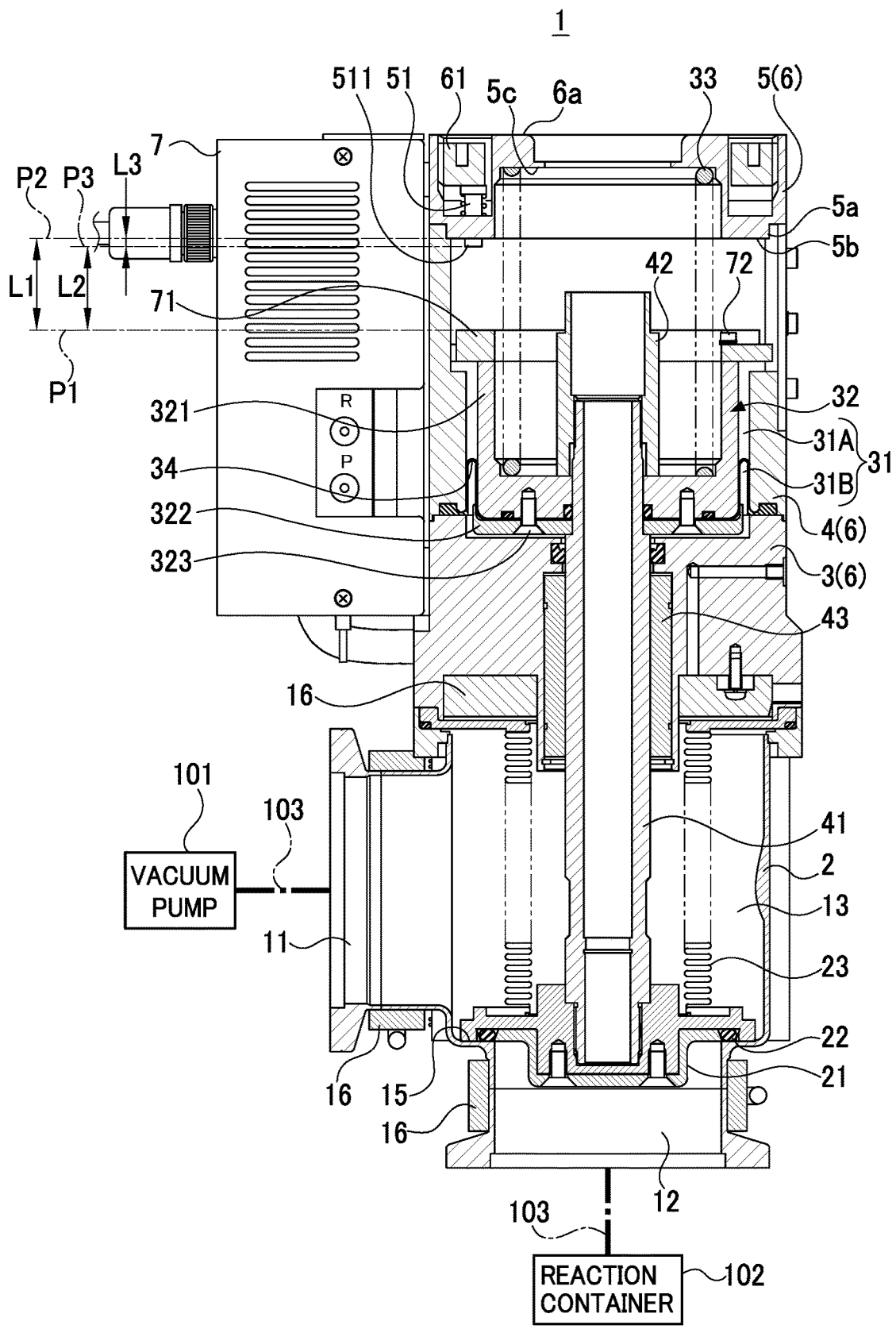
FIG. 1 is a cross-sectional view of a vacuum pressure proportional control valve in a first embodiment according to the present disclosure, showing a valve-closed state.
Figure 2:
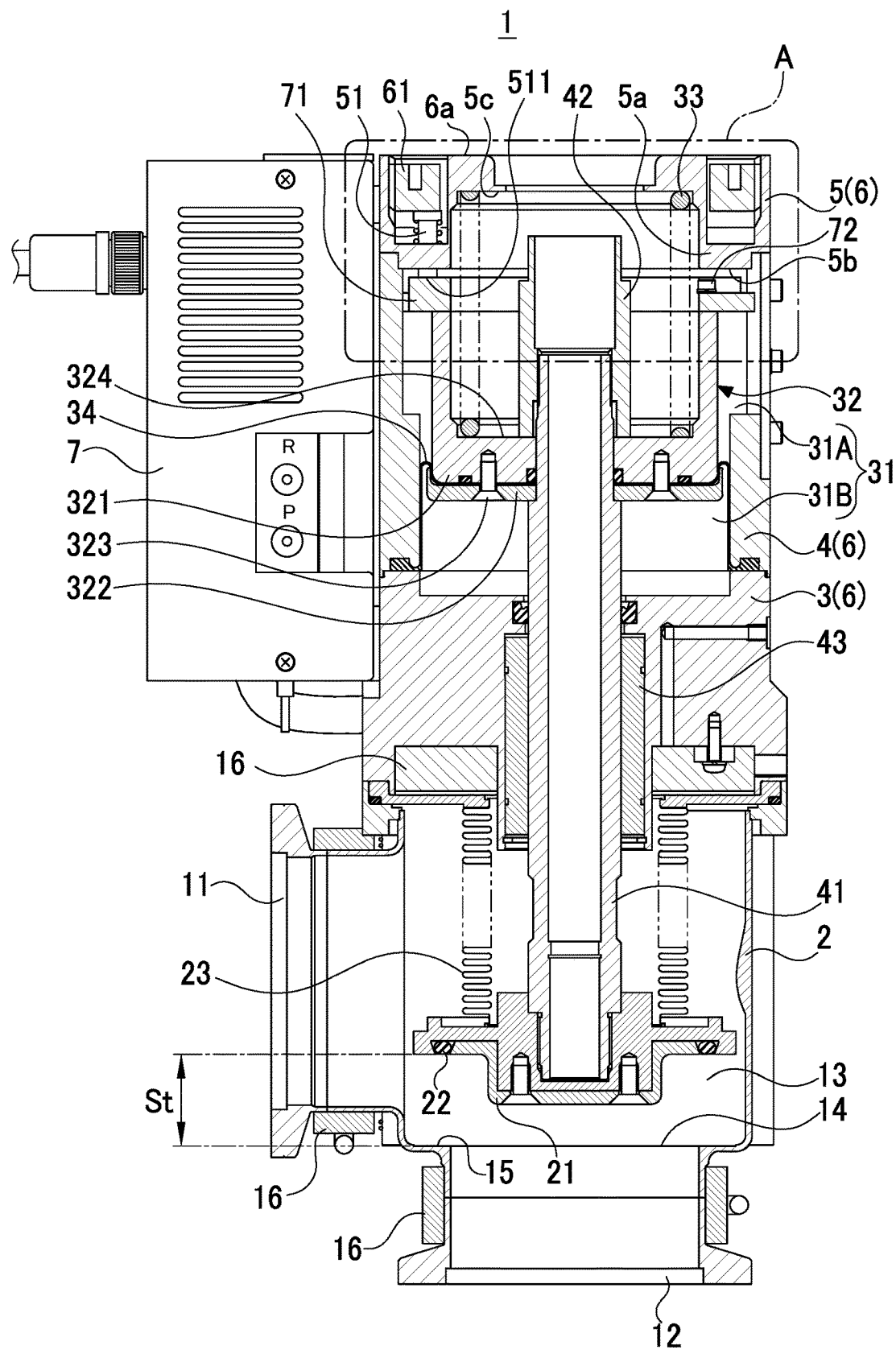
FIG. 2 is a cross-sectional view of the vacuum pressure proportional control valve in the first embodiment, showing a valve-open state.

FIG. 1 is a cross-sectional view of a vacuum pressure proportional control valve 1 in a first embodiment of the present disclosure, showing a valve-closed state. FIG. 2 is a cross-sectional view of the vacuum pressure proportional control valve 1, showing a valve-open state. In the following description, the positional relation is defined such that a second port 12 is on a "lower" side of the valve 1 and an upper cylinder cap 5 is on an "upper" side.

As shown in FIG. 1, the vacuum pressure proportional control valve 1 is placed for example on a pipe 103 connecting a reaction vessel 102 and a vacuum pump 101 in a semiconductor manufacturing equipment. As shown in FIGS. 1 and 2, the vacuum pressure proportional control valve 1 includes a valve body 2, a lower cylinder cap 3, a cylinder body 4, and the upper cylinder cap 5, which are coupled to one another with bolts 8 (see FIG. 5).

The valve body 2 has a cylindrical shape. This valve body 2 is provided with a first port 11 opening in a direction perpendicular to a central axis of the valve body 2 extending in a vertical direction in FIG. 1 and a second port 12 located coaxially with the central axis of the valve body 2. The first port 11 and the second port 12 communicate with an inner cavity 13 of the valve body 2.

As shown in FIG. 2, the valve body 2 is provided with a valve seat surface 15 at a position radially outside of a communication part 14 through which the second port 12 communicates with the inner cavity 13. A valve element 21 is placed in the inner cavity 13 and configured to contact with or separate from the valve seat surface 15. This valve element 21 includes an elastic seal member 22 mounted to be elastically deformable in a dovetail groove formed in an end face facing the valve seat surface 15.

As shown in FIGS. 1 and 2, the cylinder body 4, the lower cylinder cap 3, and the upper cylinder cap 5 constitute a cylinder 6. This cylinder 6 has a piston chamber 31 in which a piston 32 is housed in a state locked against rotation but allowed to make reciprocal linear movement.

The piston 32 includes a first piston member 321 having a cup shape that opens upward and a second piston member 322 having a circular disc shape attached to a closed bottom surface of the first piston member 321 via a specially-shaped diaphragm (hereinafter, simply referred to a "diaphragm") 34 interposed between the bottom surface of the first piston member 321 and the second piston member 322. The piston 32 is integrally assembled together with the diaphragm 34 with mounting screws 323 inserted through the second piston member 322 and the diaphragm 34 and fastened to the first piston member 321. The diaphragm 34 has an outer edge portion sandwiched between the cylinder body 4 and the lower cylinder cap 3, thus partitioning the piston chamber 31 into an upper chamber 31A and a lower chamber 31B.

A spring 33 is placed in a compressed state inside the upper chamber 31A, normally urging the piston 32 in a direction toward the valve seat 15, i.e., a valve-seating direction (downward in FIG. 1). The lower chamber 31B communicates with a pneumatic controller 7. This pneumatic controller 7 is configured to detect the position of the piston 32 and accordingly supply or discharge operation air to or from the lower chamber 31B to control the inner pressure of the lower chamber 31B. The piston 32 urged downward by the urging force of the spring 33 as shown in FIG. 1 will be moved upward against the spring 33 as the inner pressure of the lower chamber 31B rises as shown in FIG. 2.

As shown in FIG. 1, a stopper member 51 is provided in the upper cylinder cap 5 of the cylinder 6. This stopper member 51 includes a leading end portion 511 placed protruding into the upper chamber 31A of the piston chamber 31. In the present embodiment, the stopper member 51 includes a plurality of stopper members 51 arranged at predetermined intervals, that is, at equal intervals in the present embodiment, in a circumferential direction about the axis of the upper cylinder cap 5. Furthermore, an adjusting unit 61 is placed in the upper cylinder cap 5 of the cylinder 6 in contact with the stopper members 51. This adjusting unit 61 is configured to move the stopper members 51 back and forth in the moving direction of the piston 32, i.e. up and down in FIG. 1, to adjust the position of the leading end portions 511 of the stopper members 51. The configurations of those stopper members 51 and adjusting unit 61 will be described later in detail. The stopper members 51 are identical in structure and therefore one of them is described hereinafter for convenience.

For instance, the first piston member 321 and the second piston member 322 of the piston 32 are made of aluminum in order to reduce the weight and the cost of the vacuum pressure proportional control valve 1. On the other hand, the stopper member 51 is made of stainless steel for high rigidity. Thus, the hardness of the first piston member 321 is lower than the hardness of the stopper members 51. The first piston member 321 is attached, at its upper end which will contact with the stopper member 51, with a ring-shaped reinforcing member 71 integrally secured to the first piston member 321 with a screw 72. The reinforcing member 71 is made of a material capable of providing a hardness equal to or higher than the hardness of the stopper members 51. Accordingly, the first piston member 321 is less deformed when striking on the stopper member 51.

The reinforcing member 71 in the present embodiment is made of stainless steel as described above, but it may be any other material than stainless steel as long as it provides a hardness equal to or higher than the hardness of the stopper members 51. The reinforcing member 71 may be fixed to the piston 32 with any other fixing method using the screw, such as welding.

A piston rod 41 is placed with its upper end portion extending through the center of the piston 32 and is integrally attached to the piston 32 with a nut 42 tightened on the upper end portion. This piston rod 41 also extends through the lower cylinder cap 3 through a bearing 43 so as to be movable in an axial direction. The lower end portion of the piston rod 41 is placed in the inner cavity 13 of the valve body 2 and coupled to the valve element 21. Thus, the vacuum pressure proportional control valve 1 is configured to move the valve element 21 up and down together with the piston 32 via the piston rod 41 to change the distance between the valve element 21 and the valve seat surface 15. In the present specification, the distance between the valve element 21 and the valve seat surface 15 is defined as a "stroke St".

In the vacuum pressure proportional control valve 1 in which the leading end portion 511 of the stopper member 51 is located in the piston chamber 31 as shown in FIG. 2, the piston 32 is restricted from moving upward when contacting the leading end portions 511, thereby restricting the valve element 21 from moving upward. When the leading end portion 511 of the stopper member 51 is not located in the piston chamber 31, even though this state is not illustrated, the piston 32 is restricted from moving upward when contacting a lower surface 5b of an annular protrusion 5a provided annularly protruding from an upper end face inner wall 5c of the upper cylinder cap 5, thereby restricting the valve element 21 from moving upward. In the present specification, the stroke St when the piston 32 is restricted from moving upward is defined as a "full stroke".

A bellows 23 is placed in the inner cavity 13 to hermetically cover the piston rod 41 and to expand and contract according to movement of the valve element 21. This bellows 23 serves to prevent gas flowing in the inner cavity 13 from leaking out toward the cylinder 6. Heaters 16 are placed to heat the valve body 2, the bellows 23, and the valve element 21 to prevent generation of some products on the valve element 21, the bellows 23, and any flow passage surfaces.

(Configurations of Stopper Member and Adjusting Unit)

Figure 3:
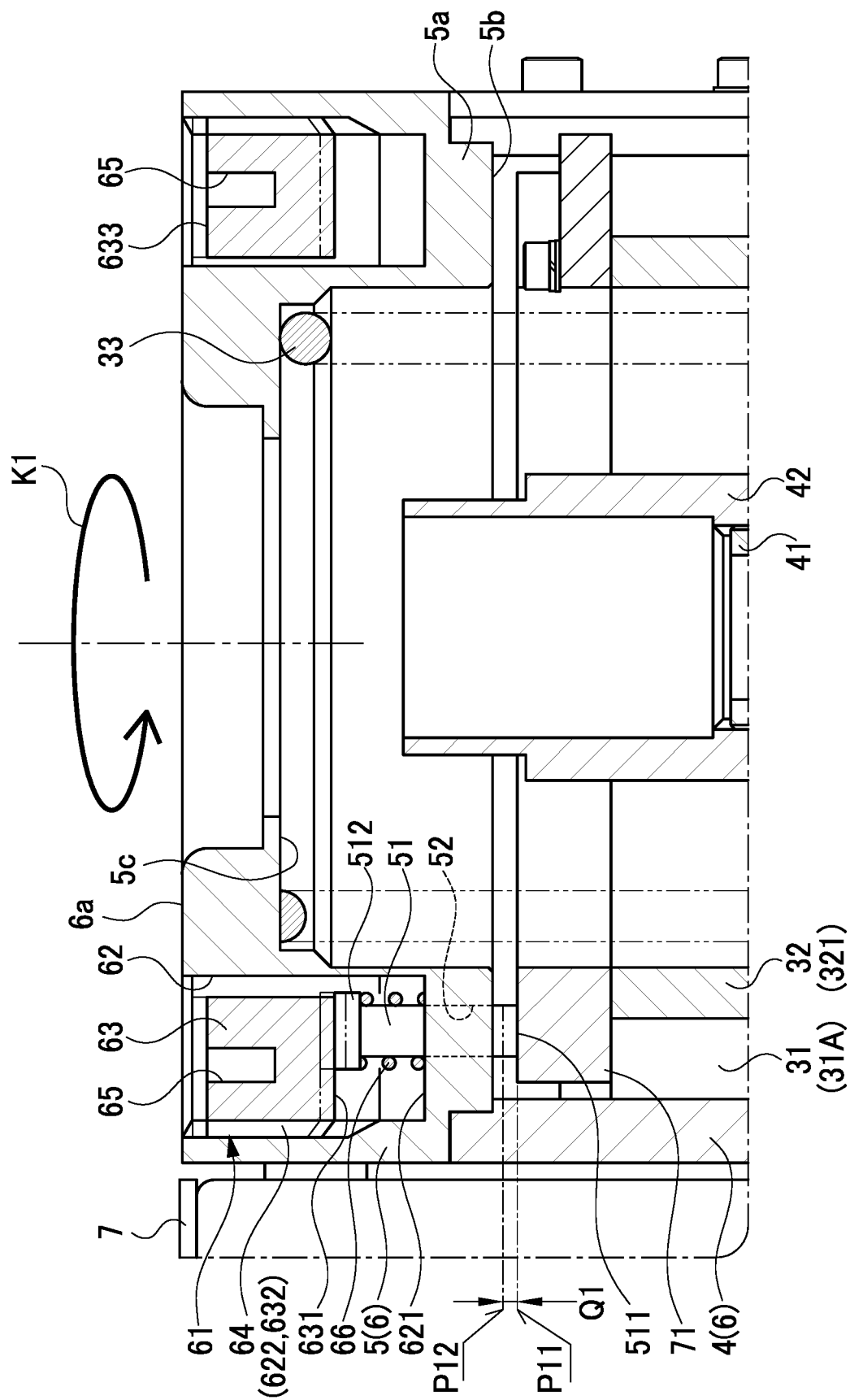
FIG. 3 is an enlarged view of a part A in FIG. 2, showing a full stroke enlarging operation.
Figure 4:
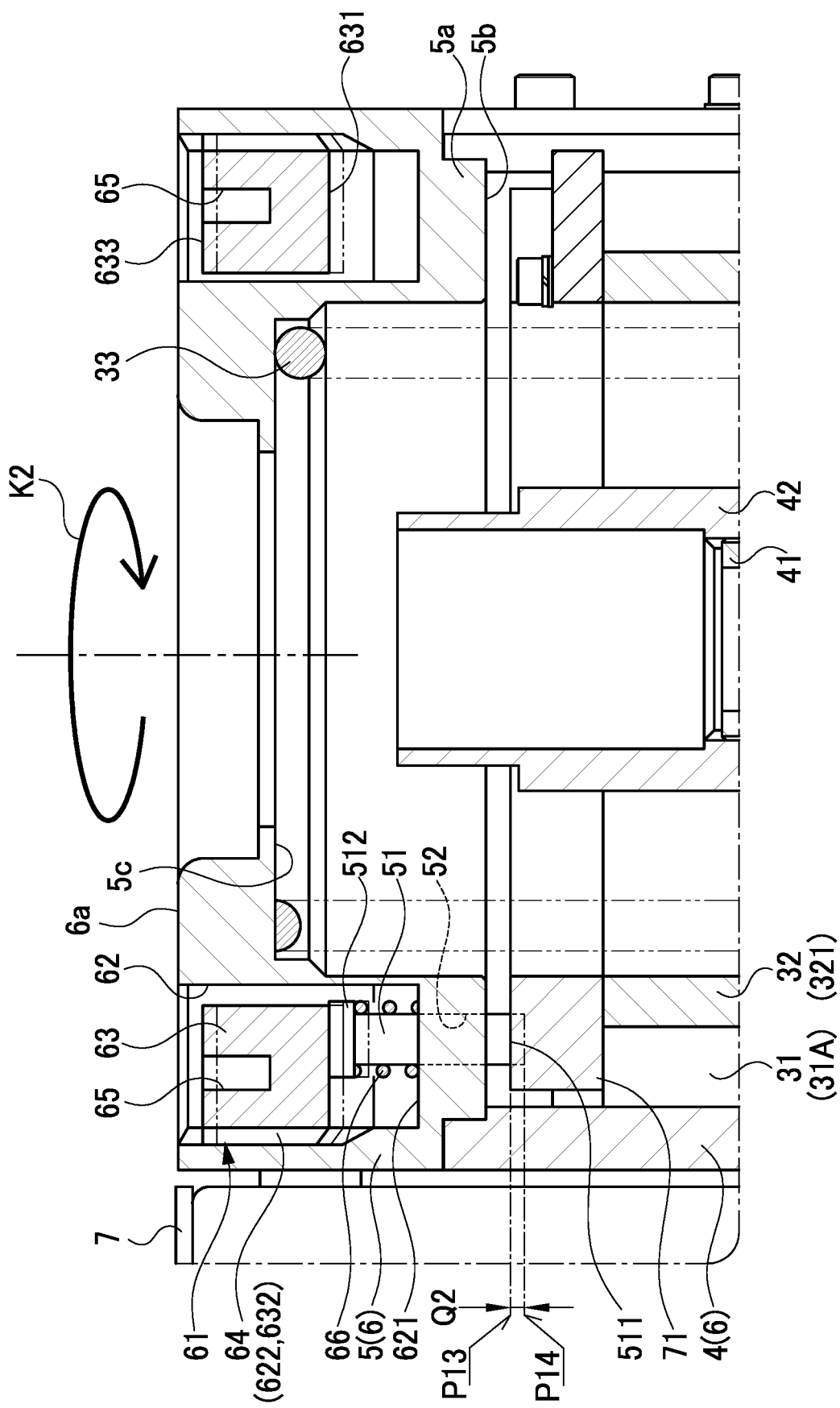
FIG. 4 is an enlarged view of the part A in FIG. 2, showing a full stroke reducing operation.
Figure 5:
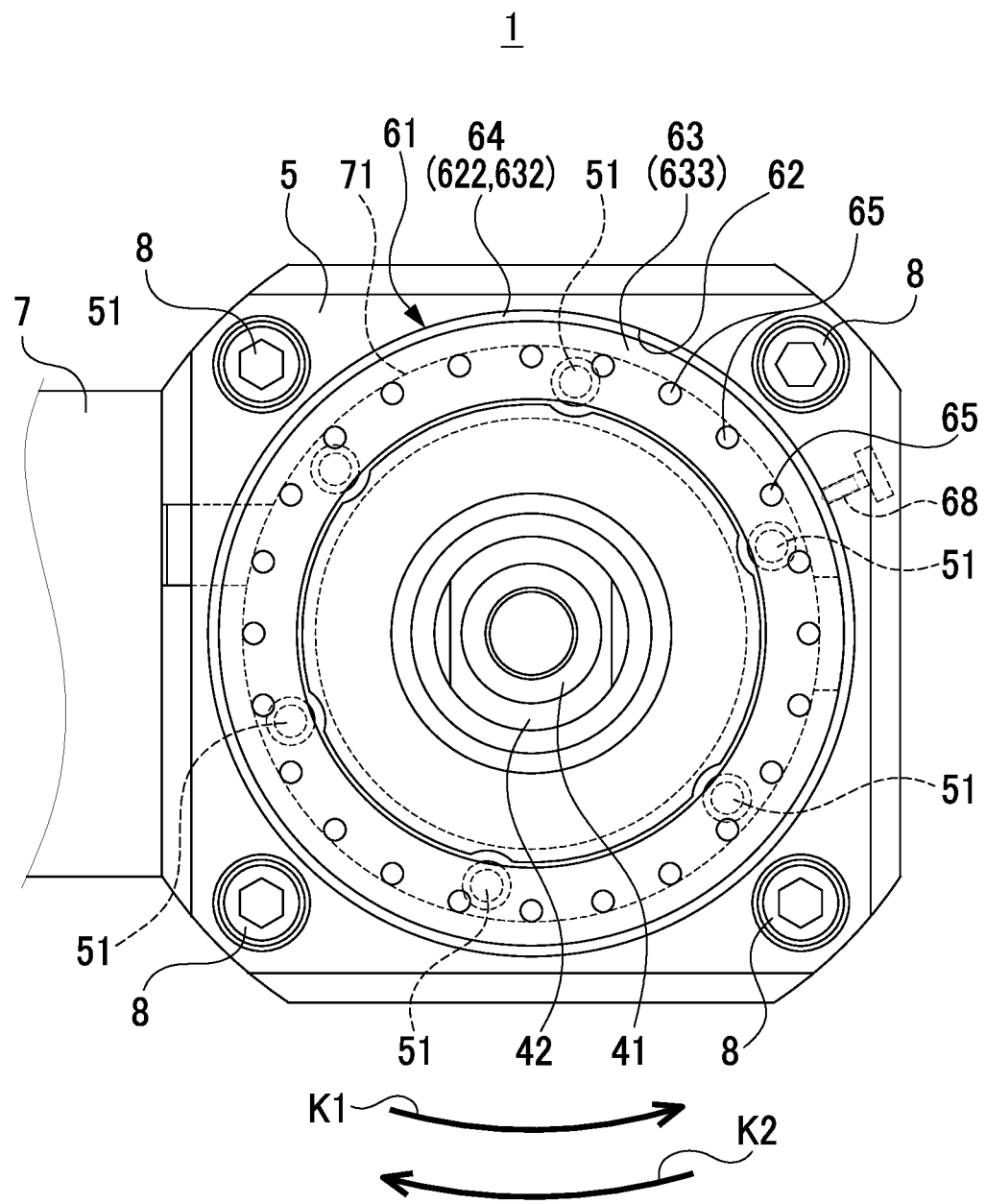
FIG. 5 is an upper view of FIG. 3.

FIG. 3 is an enlarged view of a part A in FIG. 2 and shows a full stroke enlarging operation. FIG. 4 is an enlarged view of the part A in FIG. 2 and shows a full stroke reducing operation. FIG. 5 is an upper view of FIG. 3. The adjusting unit 61 includes a contact member 63, urging springs 66, and a screw part 64. The urging springs 66 are one example of an "urging member".

As shown FIGS. 3 and 5, the contact member 63 has an annular shape. This contact member 63 is made of a material which can provide a hardness equal to or higher than the hardness of the stopper members 51. The upper cylinder cap 5 includes a housing groove 62 in which the contact member 63 is housed. The housing groove 62 is provided to annularly extend around the axis of the cylinder 6. The contact member 63 is coupled to the upper cylinder cap 5 through the screw part 64. This screw part 64 includes external threads 632 formed on the outer peripheral surface of the contact member 63 and internal threads 622 formed on the inner peripheral surface of the housing groove 62, the inner peripheral surface being located radially outside.

The contact member 63 is locked from rotating by means of a rotation locking member 68 provided in the upper cylinder cap 5 as shown in FIG. 5. The rotation locking member 68 is one example of a "fixing member". Specifically, the rotation locking member 68 in the present embodiment is a screw which threadedly engages with the upper cylinder cap 5 and has a leading end portion capable of abutting on the outer peripheral surface of the contact member 63. When this rotation locking member 68 is turned to a rotation locking position, making the leading end portion abut on the contact member 63, the contact member 63 is locked from rotating. When the rotation locking member 68 is reversely turned to a rotation allowing position, separating the leading end portion from the contact member 63, the contact member 63 is allowed to rotate.

As shown in FIG. 3, in the upper cylinder cap 5, the the housing groove 62 has a bottom wall 621 formed with a plurality of insertion holes 52 at positions corresponding to the stopper members 51. Each insertion hole 52 is provided extending in the moving direction of the piston 32 to allow communication between the housing groove 62 and the piston chamber 31. Each stopper member 51 is inserted slidably in the corresponding insertion holes 52 from the housing groove 62 side so that each leading end portion 511 is positioned in the piston chamber 31. The urging spring 66 is placed in a compressed state between a rear end portion 512 of the stopper member 51 and the bottom wall 621 of the housing groove 62 to normally urge the stopper member 51 toward the contact member 63. Thus, each stopper member 51 can be moved in association with upward/downward movement of the contact member 63 to change the position of the leading end portion 511.

Herein, the contact member 63 is housed in the housing groove 62 so as not to protrude above the upper end face 6a of the upper cylinder cap 5. This makes difficult to rotate the contact member 63 by hand.

Therefore, the contact member 63 is provided with a plurality of engagement holes 65 in an upper surface (a first surface) 633 located opposite a lower surface 631 (a second surface) contacting with the stopper members 51 as shown in FIG. 5. The engagement holes 65 are configured to allow a jig 9 for rotation (a rotation jig) which will be mentioned later to be engaged therewith in rotating the contact member 63. This rotation jig 9 used herein is for example shown in FIGS. 6 and 7. The engagement holes 65 are arranged at equal intervals in a circumferential direction and at positions symmetric with respect to the center of the contact member 63. In the present embodiment, for example, the contact member 63 includes twenty-four engagement holes 65 arranged at an interval of 15°.

Figure 6:
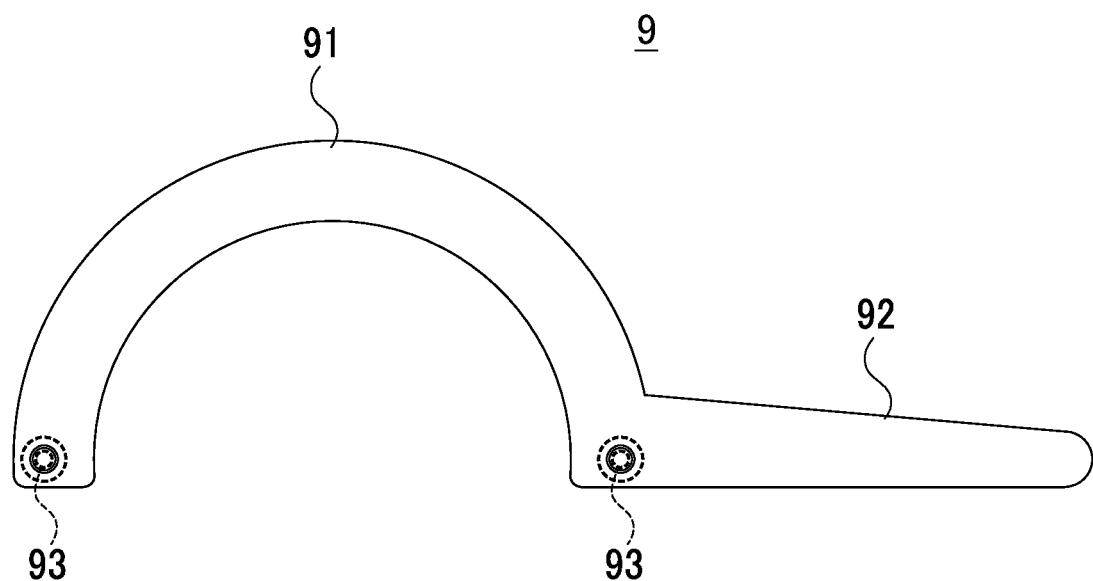
FIG. 6 is a plan view of a rotation jig.
Figure 7:
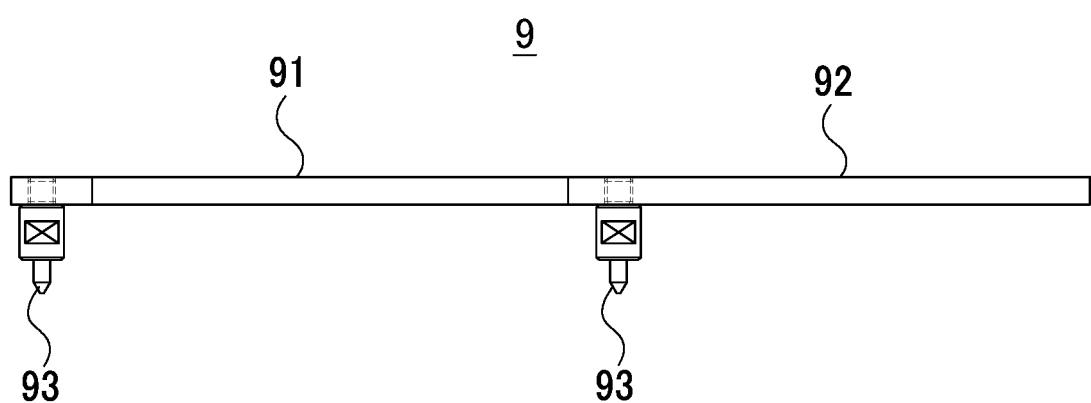
FIG. 7 is a side view of the rotation jig.

FIG. 6 is a plan view of the rotation jig 9. FIG. 7 is a side view of this jig 9. The rotation jig 9 includes a circular arc part 91 having a semi-circular arc shape and a grip part 92 extending radially outward from the circular arc part 91. A pair of engagement pins 93 is provided protruding upright from one surface of the circular arc part 91 so as to be inserted simultaneously in two of the engagement holes 65 in order to rotate the contact member 63 together with the rotation jig 9. The rotation jig 9 is designed so that the circular arc part 91 and the grip part 92 are made with a thin and uniform thickness by for example press work, leading to cost reduction. The engagement pins 93 used herein are stepped pins for high strength. In the present embodiment, the pair of engagement pins 93 are positioned at a phase difference of 180° to enable rotation of the contact member 63 with good balance. However, those pins 93 are not limited in such an arrangement.

(Operations)

The operations of the vacuum pressure proportional control valve 1 configured as above will be described below. While a process is performed in the reaction vessel 102, the lower chamber 31 of the vacuum pressure proportional control valve 1 is not pressurized. Thus, the piston 32 is held down by the urging force of the spring 33, placing the elastic seal member 22 in tight contact with the valve seat surface 15, thereby closing the communication part 14, as shown in FIG. 1.

On completion of the process, the vacuum pressure proportional control valve 1 is opened with operation air supplied from the pneumatic controller 7 to the lower chamber 31B, so that the gas in the reaction vessel 102 is sucked by the vacuum pump 101 and exhausted out. At the start time of exhaust, the pneumatic controller 7 supplies the operation air to the cylinder 6 (i.e., the lower chamber 31B) so as to allow the gas to leak or flow from the reaction vessel 102 through a gap between the elastic seal member 22 and the valve seat 15. Accordingly, the gas is exhausted at a small flow rate from the reaction vessel 102 without stirring up particles. When the inner pressure of the reaction vessel 102 becomes low to a predetermined vacuum pressure, the pneumatic controller 7 then supplies operation air to the cylinder 6 (i.e., the lower chamber 31B) to increase the inner pressure of the cylinder 6 (i.e., the lower chamber 31B). The vacuum pressure proportional control valve 1 is thus opened by the full stroke as shown in FIG. 2. Thus, the gas is exhausted at a large flow rate from the reaction vessel 102. This can shorten the time needed for exhaust.

When the inner pressure of the reaction vessel 102 becomes low to a target pressure, the pneumatic controller 7 stops supply of the operation air and allows communication between the low chamber 31B and the exhaust passage. Then, the piston 32 is moved downward by the urging force of the spring 33 and returns to a valve-closed state shown in FIG. 1.

If the stopper members 51 are not considered, the piston 32 in the vacuum pressure proportional control valve 1 can be moved from a valve-closed position P1 for making the valve element 21 contact with the valve seat surface 15 to a mechanical stop position P2 for making the piston 32 contact with the lower end face 5*b* of the annular protrusion 5*a* of the upper cylinder cap 5. The region from the valve-closed position P1 to the mechanical stop position P2 is defined as a "maximum movable range L1".

However, an opening-degree sensor built in the pneumatic controller 7 is configured to detect the piston 32 in a region from the valve-closed position P1 to an upper limit position P3 located below the mechanical stop position P2 in order to exclude an individual difference of the full stroke. In the region from the upper limit position P3 to the mechanical stop position P2, therefore, the opening-degree sensor of the pneumatic controller 7 cannot detect the piston 32. In the present embodiment, the region from the valve-closed position P1 to the upper limit position P3 is defined as a "detectable range L2" and the region from the upper limit position P3 to the mechanical stop position P2 is defined as a "non-detectable range L3".

Accordingly, within the detectable range L2, the vacuum pressure proportional control valve 1 can fix the full stroke by control using the opening-degree sensor of the pneumatic controller 7, whereas it cannot fix the full stroke in the non-detectable range L3 by control using the opening-degree sensor of the pneumatic controller 7. However, the vacuum pressure proportional control valve 1 in the present embodiment is configured to adjust the position of the leading end portions 511 of the stopper members 51 by use of the adjusting unit 61 to allow manual adjustment of the full stroke even in the non-detectable range L3.

(Method for Manually Adjusting the Full Stroke)

For example, when the position of the leading end portion 511 is to be moved upward as shown in FIG. 3, the vacuum pressure proportional control valve 1 is operated such that the rotation locking member 68 is turned to separate from the contact member 63 to unlock the contact member 63. Further, the pair of engagement pins 93 of the rotation jig 9 are inserted in two of the engagement holes 65 located in diametrically opposed positions. Then, the rotation jig 9 is manipulated to turn the contact member 63 counterclockwise K1, seen from above the vacuum pressure proportional control valve 1.

The contact member 63 is thus moved upward by screw feeding of the screw part 64 as indicated by a chain line in FIG. 3. The urging spring 66 expands as the contact member 63 moves upward, thereby moving the stopper member 51 upward. This changes the position of the leading end portion 511 of the stopper member 51 from a position P11 up to a position P12 in FIG. 3. The piston 32 can therefore be moved upward by the distance Q1 defined between the positions P11 and P12. This enlarges the full stroke of the vacuum pressure proportional control valve 1.

On completion of positional adjustment of the stopper member 51, the rotation locking member 68 is screwed down into contact with the contact member 63, thereby locking the contact member 63. This fixedly positions the stopper member 51. Even if the piston 32 repeatedly strikes on the stopper member 51, therefore, the position of the leading end portion 511 is less likely to be displaced.

In contrast, for example, when the leading end portion 511 is to be moved downward as shown in FIG. 4, the stopper member 51 is moved in reverse order to the above procedure. Briefly speaking, in the vacuum pressure proportional control valve 1, the contact member 63 is released from the state locked by the rotation locking member 68 and then the contact member 63 is rotated clockwise K2, seen from above the vacuum pressure proportional control valve 1. As rotated, the contact member 63 pushes down the stopper member 51 by screw feeding of the screw part 64 against the urging force of the urging spring 66. This moves the leading end portion 511 of the stopper member 51 from a position P13 to a position P14 in FIG. 4. Thus, the vacuum pressure proportional control valve 1 reduces the full stroke by the distance Q2 defined between the positions P13 and P14.

The vacuum pressure proportional control valve 1 can control the position of the leading end portion 511 of the stopper member 51 based on a rotation amount of the contact member 63 even in the non-detectable range L3 in which the opening-degree sensor of the pneumatic controller 7 cannot detect the stroke St.

For example, when the maximum movable range L1 is 32 mm and the detectable range L2 is 28 mm, the non-detectable range L3 falls within a range larger than 28 mm but 32 mm or less. Assuming that the screw part 64 is formed to move the stopper member 51 by 2 mm for 360° rotation of the contact member 63, the following operations are obtained.

For example, when the contact member 63 is rotated two turns (720°), counterclockwise K1, from a state in which the leading end portion 511 of the stopper member 51 is located at the upper limit position P3, the leading end portion 511 comes at the open end of the insertion hole 52. Accordingly, the piston 32 can be moved to the mechanical stop position P2. This allows the valve element 21 in the vacuum pressure proportional control valve 1 to move upward from the valve seat surface 15 to a position 32 mm away therefrom.

As another example, when the contact member 63 is rotated 90°, counterclockwise K1, from a state in which the leading end portion 511 of the stopper member 51 is located at the upper limit position P3, the leading end portion 511 comes at a position 0.5 mm above the upper limit position P3, thus enlarging the full stroke. Subsequently, when the contact member 63 is rotated 45°, clockwise K2, the leading end portion 511 is moved down to a position 0.25 mm above the upper limit position P3, thus reducing the full stroke.

Consequently, even when the vacuum pressure proportional control valve 1 cannot control and fix the full stroke by use of the opening-degree sensor of the pneumatic controller 7, the vacuum pressure proportional control valve 1 can fix the full stroke by use of the stopper members 51 and the adjusting unit 61.

(Exhaust Characteristics Test)

Figure 8:
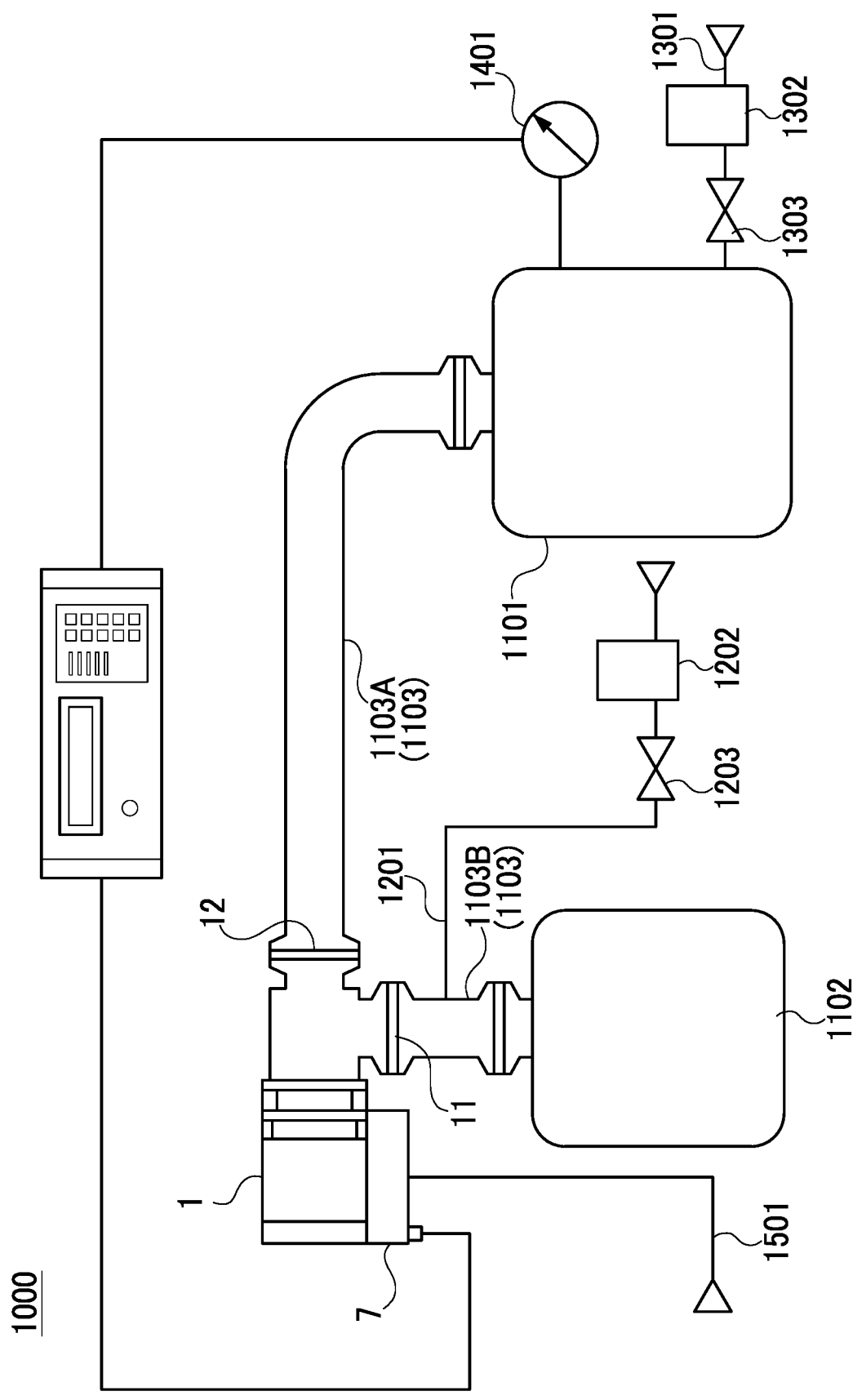
FIG. 8 is a schematic configuration diagram of a testing device.
Figure 9:
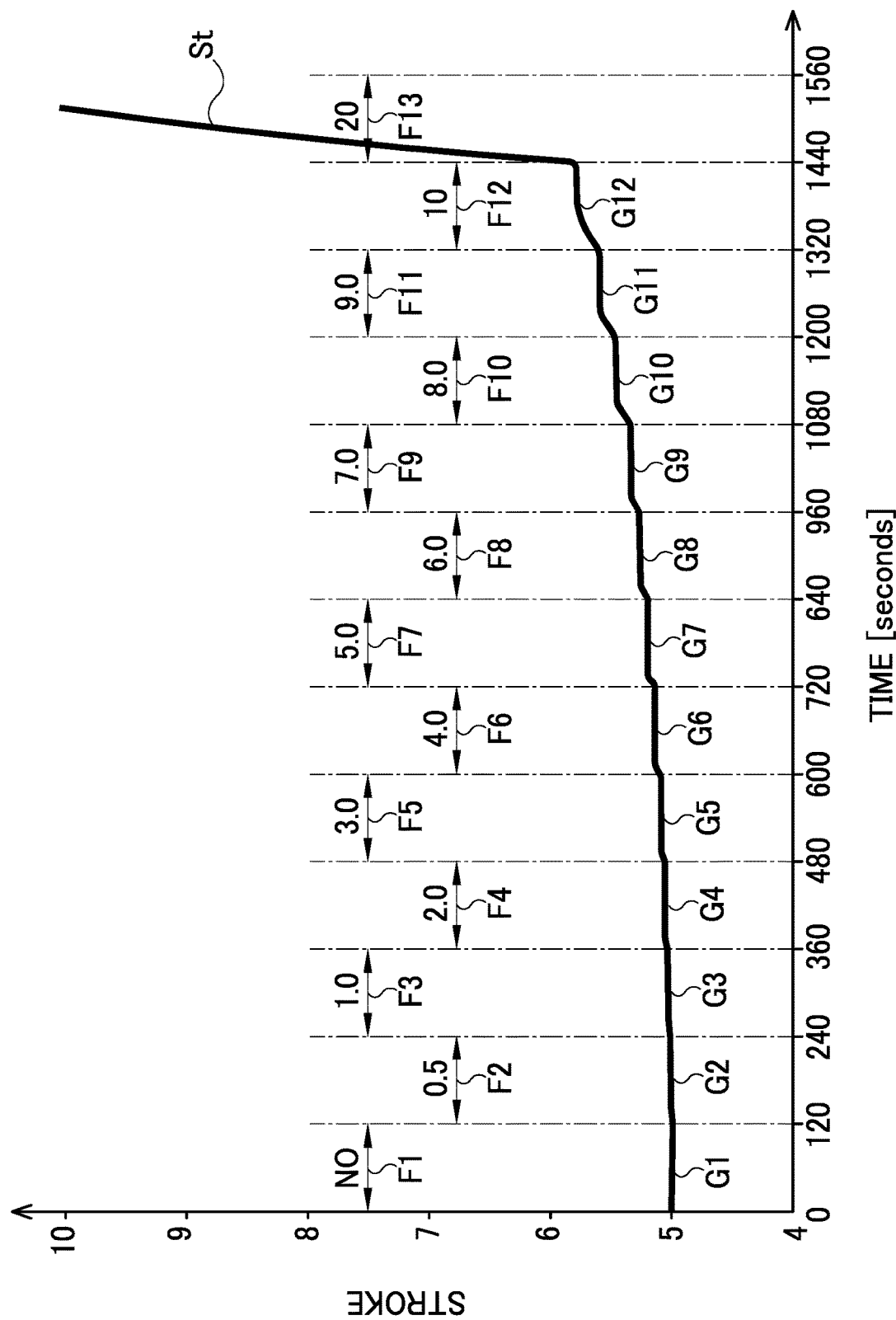
FIG. 9 is a graph showing test results.

An exhaust characteristics test for investigating the influence of the stroke St of the vacuum pressure proportional control valve 1 on the exhaust characteristics will be explained below referring to FIGS. 8 and 9. FIG. 8 is a schematic configuration diagram of a testing device 1000. FIG. 9 is a graph showing test results.

As shown in FIG. 8, the testing device 1000 is configured such that the vacuum pressure proportional control valve 1 is placed on a pipe 1103 connecting a chamber 1101 and a vacuum pump 1102. In this vacuum pressure proportional control valve 1, the stopper member 51 is placed at a retracted position in which the leading end portion 511 is located inside the insertion hole 52. Thus, the vacuum pressure proportional control valve 1 can change the stroke St in a range of 0 mm to 32 mm.

The pipe 1103 includes a first connection pipe 1103A connecting the second port 12 of the vacuum pressure proportional control valve 1 to the chamber 1101 and a second connection pipe 1103B connecting the first port 11 of the vacuum pressure proportional control valve 1 to the vacuum pump 1102. The pneumatic controller 7 of the vacuum pressure proportional control valve 1 is connected to an operation air supply pipe 1501 for supplying operation air.

The first connection pipe 1103A is 80 mm in flow path diameter and 1.5 m in length. The second connection pipe 1103B is 80 mm in path diameter and 0.2 m in length. To the second connection pipe 1103B, a ballast supply pipe 1201 is connected to supply a ballast fluid at a flow rate regulated by a mass flow controller 1202 and a valve 1203. The operation air supply pipe 1501 is 6 mm in flow path diameter and 3 m in length.

The chamber 1101 has a volume of 200 L. This chamber 1101 is connected to an air supply pipe 1301 through which air is supplied at a flow rate regulated by a mass flow controller 1302 and a valve 1303. The inner pressure of the chamber 1101 is detected by a pressure sensor 1401.

In the test, the pressure of operation air to be supplied to the pneumatic controller 7 is set to 0.5 MPa. Further, the pressure of air to be supplied to the chamber 1101 is set to 0.2 MPa. The pressure of a ballast fluid to be supplied to the second connection pipe 1103B is set to 0.2 MPa. In the test, the supply amount of air to be supplied to the chamber 1101 is regulated to hold the inner pressure of the chamber 1101 at 100 Pa. Under this control, the testing device 1000 is operated to change the flow rate of the ballast fluid at intervals of 120 seconds by use of the mass flow controller 1202 and the valve 1203 to zero (0.00 slm), 0.5 slm, 1.0 slm, 2.0 slm, 3.0 slm, 4.0 slm, 5.0 slm, 6.0 slm, 7.0 slm, 8.0 slm, 9.0 slm, 10 slm, and 20 slm. For each flow rate of the ballast fluid, the stroke St of the vacuum pressure proportional control valve 1 was measured by use of the opening-degree sensor built in the pneumatic controller 7.

As shown in FIG. 9, when the flow rate of the ballast fluid is regulated to zero (0.0 slm) as indicated by F1, the stroke St is about 5.01 mm as depicted by G1. When the flow rate of the ballast fluid is regulated to 0.5 slm as indicated by F2, the stroke St is about 5.02 mm as depicted by G2. When the flow rate of the ballast fluid is regulated to 1.0 slm as indicated by F3, the stroke St is about 5.04 mm as depicted by G3. When the flow rate of the ballast fluid is regulated to 2.0 slm as indicated by F4, the stroke St is about 5.07 mm as depicted by G4. When the flow rate of the ballast fluid is regulated to 3.0 slm as indicated by F5, the stroke St is about 5.11 mm as depicted by G5. When the flow rate of the ballast fluid is regulated to 4.0 slm as indicated by F6, the stroke St is about 5.16 mm as depicted by G6. When the flow rate of the ballast fluid is regulated to 5.0 slm as indicated by F7, the stroke St is about 5.22 mm as depicted by G7. When the flow rate of the ballast fluid is regulated to 6.0 slm as indicated by F8, the stroke St is about 5.30 mm as depicted by G8.

When the flow rate of the ballast fluid is regulated to 7.0 slm as indicated by F9, the stroke St is about 5.40 mm as depicted by G9. When the flow rate of the ballast fluid is regulated to 8.0 slm as indicated by F10, the stroke St is about 5.52 mm as depicted by G10. When the flow rate of the ballast fluid is regulated to 9.0 slm as indicated by F11, the stroke St is about 5.67 mm as depicted by G11. When the flow rate of the ballast fluid is regulated to 10 slm as indicated by F12, the stroke St is about 5.87 mm as depicted by G12. When the flow rate of the ballast fluid is regulated to 20 slm as indicated by F13, the stroke St is about 17.15 mm.

The above test results reveal that the vacuum pressure proportional control valve 1 tends to increase the stroke St when the chamber 1101 is held at a constant inner pressure and further the flow rate of the ballast fluid is increased to make it harder for the exhaust fluid to flow from the vacuum pressure proportional control valve 1 to the vacuum pump 1102.

The configuration shown in FIG. 1 may cause difficulty in flowing exhaust gas to the pipe 103 for example when the pipe 103 is as long as 30 m to 50 m or when the vacuum pump 101 provides large pumping power. In those circumstances, the vacuum pressure proportional control valve 1 is configured to move the stopper member 51 by use of the adjusting unit 61 to enlarge the full stroke beyond the detectable range L2, that is, into the non-detectable range L3. This allows exhaust gas to smoothly flow in the pipe 103, thus improving the variations in exhaust performance due to the length of the pipe 103 or the pumping power of the vacuum pump 101. Changing the exhaust performance of the vacuum pressure proportional control valve 1 as above can reduce the pressure loss generated in the pipe 103. This allows gas to be efficiently discharged from the reaction vessel 102, thus enabling shortening of the time required for exhaust.

(Conclusion)

As described above, the vacuum pressure proportional control valve 1 in the present embodiment is placed on the pipe 103 connecting the reaction vessel 102 and the vacuum pump 101 and configured to control the vacuum pressure in the reaction vessel 102. The vacuum pressure proportional control valve 1 includes the cylinder 6 provided with the piston chamber 31, the piston 32 housed in the piston chamber 31 so as to make reciprocal linear movement, the valve seat surface 15, the valve element 21 configured to contact with or separate from the valve seat surface 15 according to the movement of the piston 32, the stopper members 51 provided in the cylinder 6 and having the leading end portions 511 protruding in the piston chamber 31, each stopper member 51 being configured to bring the vacuum pressure proportional control valve 1 into a fully open state when the piston 32 contacts with the leading end portions 51, and the adjusting unit 61 configured to move the stopper members 51 back and forth in the moving direction of the piston 32 to adjust the position of the leading end portions 511.

Since the foregoing vacuum pressure proportional control valve 1 is configured to move the stopper members 51 back and forth in the axial direction by use of the adjusting unit 61 to adjust the full stroke, it can change exhaust characteristics according to the length of the pipe 103 for connecting the reaction vessel 102 and the vacuum pump 101 and the pumping power of the vacuum pump 101.

In the vacuum pressure proportional control valve 1 in the present embodiment, the adjusting unit 61 includes the contact member 63 placed in a part (the upper cylinder cap 5) of the cylinder 6, located on an opposite side to the valve seat surface 15, so that the contact member 63 can contact with the rear end portions 512 of the stopper members 51, the urging springs 66 biasing the stopper members 51 toward the contact member 63, and the screw part 64 configured to move the contact member 63 in the moving direction of the piston 32. The vacuum pressure proportional control valve 1 configured as above can move the stopper members 51 with high responsiveness according to the rotation of the contact member 63, thereby adjusting the full stroke.

Second Embodiment

Figure 10:
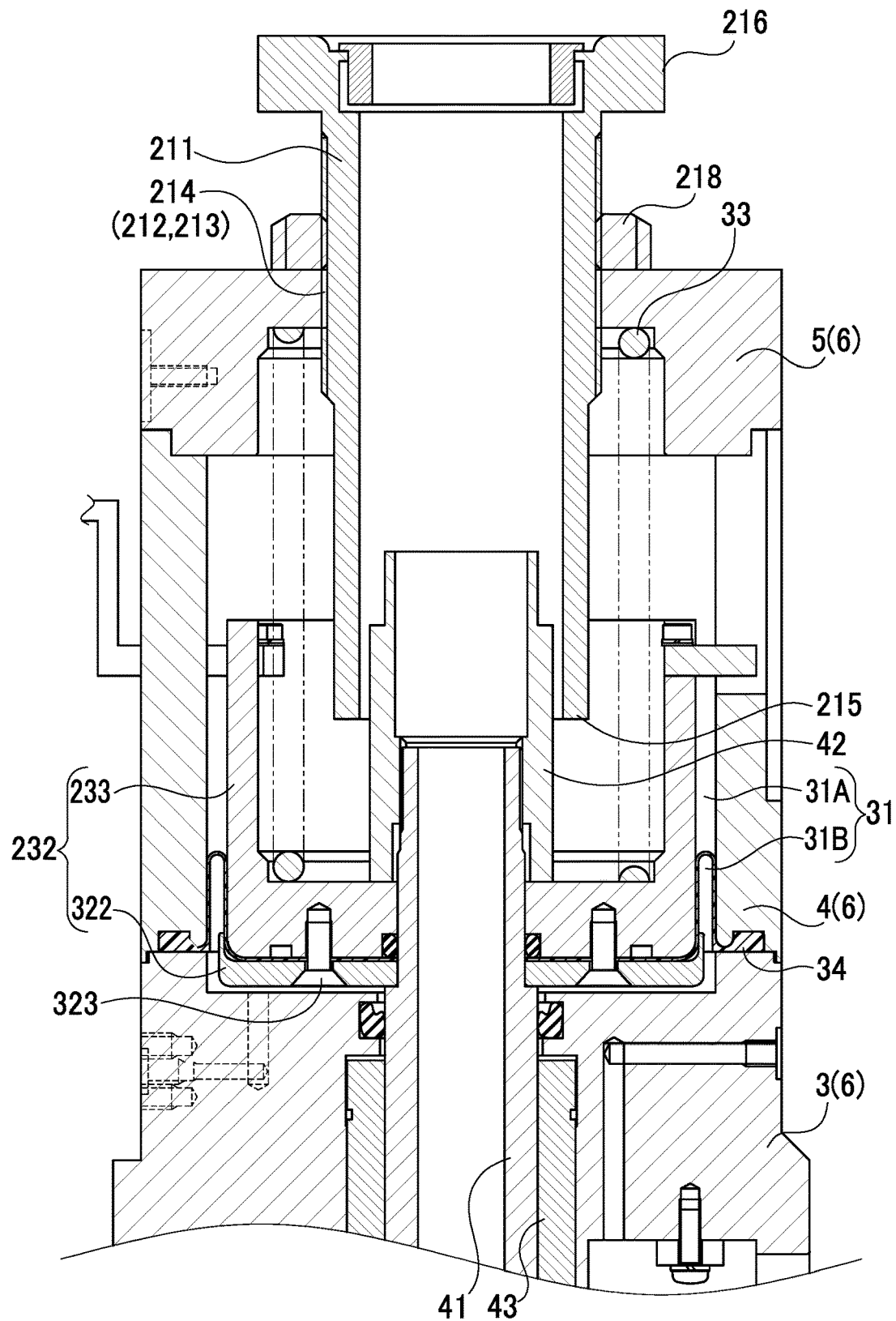
FIG. 10 is a partially enlarged view of a vacuum pressure proportional control valve in a second embodiment according to the present disclosure, showing a valve-closed state.
Figure 11:
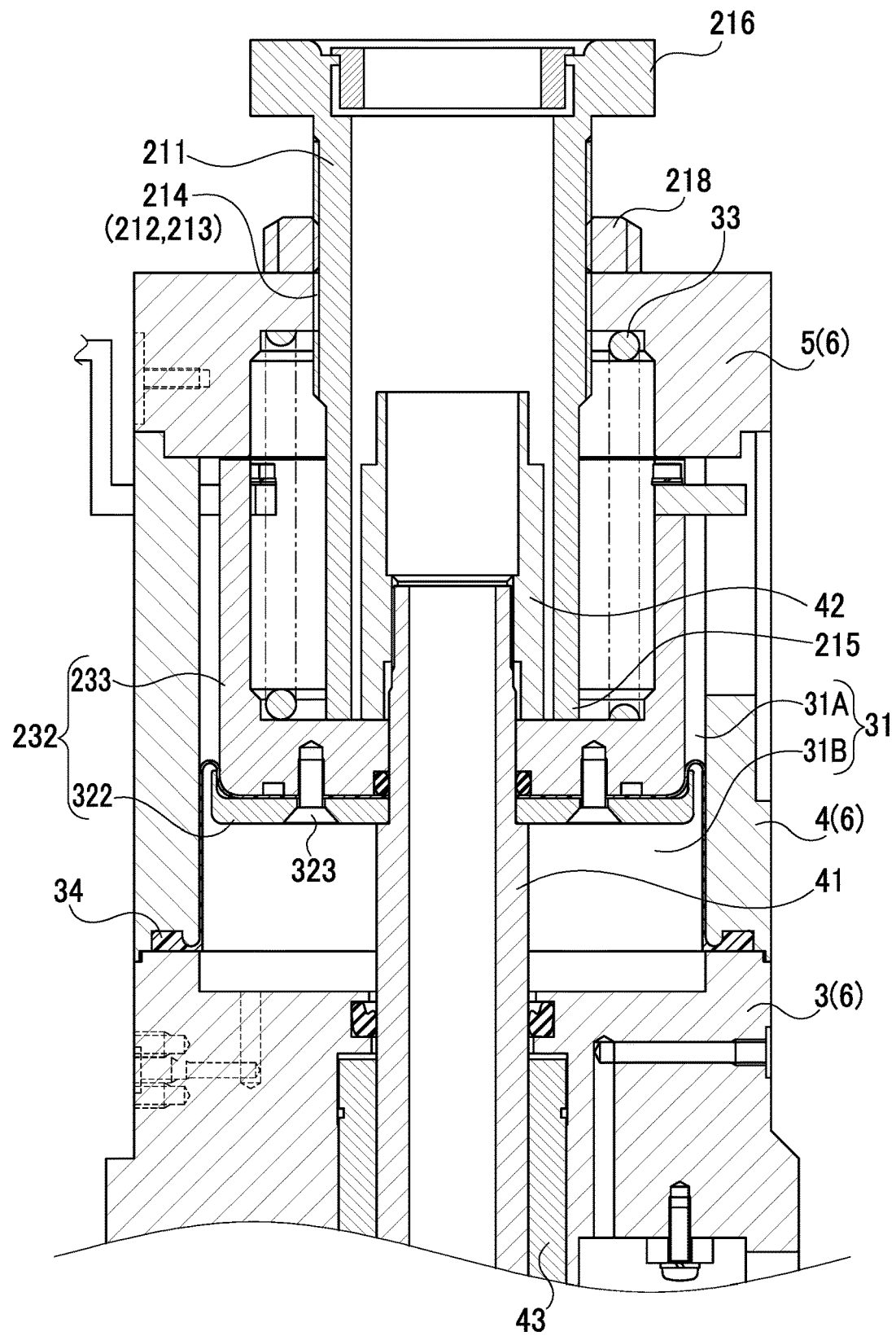
FIG. 11 is a partially enlarged view of the vacuum pressure proportional control valve in the second embodiment, showing a valve-open state.

A second embodiment of the present disclosure will be described below. FIG. 10 is a partially enlarged cross-sectional view of a vacuum pressure proportional control valve 201 in this embodiment, showing a valve-closed state. FIG. 11 is a partially enlarged cross-sectional view of the vacuum pressure proportional control valve 201, showing a fully-open state.

The vacuum pressure proportional control valve 201 is identical in structure to the vacuum pressure proportional control valve 1 in the first embodiment except for a stopper member 211, a screw part 214, and a piston 232.

The stopper member 211 is made of stainless rod and placed coaxially with the piston rod 41. The stopper member 211 is also placed to extend through the upper cylinder cap 5 so that a leading end portion 215 of the stopper member 211 is located inside the upper chamber 31A of the piston chamber 31 and a rear end portion 216 of the stopper member 211 is located protruding out of the upper cylinder cap 5.

The screw part 214 includes internal treads 212 formed on the upper cylinder cap 5 and external threads 213 formed on the stopper member 211. The stopper member 211 is movable in the axial direction by screw feeding of the screw part 214 to change the position of the leading end portion 215 placed in the upper chamber 31A. Thus, this screw part 214 is one example of an "adjusting unit".

A tightening nut 218 threadedly engages with the external threads 213 of the stopper member 211. This tightening nut 218 is one example of a "fixing member". When the nut 218 is tightened into contact with the upper cylinder cap 5, the stopper member 211 is restricted from rotation by frictional resistance generated in the contact surfaces of the nut 218 and the upper cylinder cap 5, so that the position of the leading end portion 215 is fixed.

The piston 232 includes a first piston member 233 made of stainless steel and the second piston member 322 made of aluminum. Thus, the part of the piston 232, i.e., the first piston member 233, which will contact with the stopper member 211, is designed with a hardness equal to or higher than the hardness of the stopper member 211 to prevent deformation which may be caused when the piston 232 strikes on the stopper member 211.

In the foregoing vacuum pressure proportional control valve 201, when the stopper member 211 is rotated counterclockwise directly by hand, the stopper member 211 is moved upward by screw feeding of the screw part 214, thereby enlarging the full stroke. Reversely, when the stopper member 211 is rotated clockwise directly by hand, the stopper member 211 is moved downward by screw feeding of the screw part 214, thereby reducing the full stroke. Therefore, the vacuum pressure proportional control valve 201 can change the exhaust characteristics simply by rotation of the stopper member 211.

On completion of the positional adjustment of the stopper member 211 in the vacuum pressure proportional control valve 201, the tightening nut 218 is moved, or rotated, to a contact position with the upper cylinder cap 5. Accordingly, even when the piston 232 strikes on the stopper member 211, this stopper member 211 is restricted from rotating due to frictional resistance generated between the nut 218 and the upper cylinder cap 5 as mentioned above. Thus, the position of the leading end portion 215 is kept unchanged.

Consequently, the vacuum pressure proportional control valve 201 in the present embodiment includes the stopper member 211 provided in the cylinder 6 and including the leading end portion 215 placed inside the piston chamber 31, the stopper member 211 being configured to place the vacuum pressure proportional control valve 201 in a fully-open state when the leading end portion 215 contacts with the piston 232, and the adjusting unit configured to move the stopper member 211 back and forth in the moving direction of the piston 232 to adjust the position of the leading end portion 215. The stopper member 211 extends through the cylinder 6 in the moving direction of the piston 232. The adjusting unit in the present embodiment is the screw part 214 provided to the stopper member 211 and the cylinder 6 for threaded engagement therebetween. The thus configured vacuum pressure proportional control valve 201 can change the position of the stopper member 211 to adjust the full stroke with a simple configuration in which the stopper member 211 is threadedly provided to the stopper member 211.

The foregoing embodiments are mere examples and give no limitation to the present disclosure. The present disclosure may be embodied in other specific forms without departing from the essential characteristics thereof.

For instance, the contact member 63 may be placed to protrude out of the housing groove 62. However, in the configuration that the contact member 63 is placed entirely inside the housing groove 62 without protruding out of the cylinder 6 as in the foregoing first embodiment, the adjusting unit 61 can be mounted in the cylinder 6 without changing the valve size of the vacuum pressure proportional control valve 1.

For instance, the stopper members 51 do not necessarily need to be arranged at equal intervals in the circumferential direction of the contact member 63. However, when the stopper members 51 are arranged at equal intervals in the circumferential direction of the contact member 63 as in the first embodiment, the impact occurring when the piston 32 strikes on the stopper members 51 will be dispersed uniformly over the contact member 63. This can reduce the load on the screw part 64.

For instance, the contact member 63 may not be formed with the engagement holes 65. However, when engagement holes 65 are provided as in the foregoing embodiment, it is possible to easily rotate the contact member 63 housed in the housing groove 62 by use of the rotation jig 9 and thus adjust the full stroke. Further, the rotation jig 9 can be designed with a simple shape, which can result in a compact size.

For example, the reinforcing member 71 may be dispensed with. However, when the reinforcing member 71 is provided to the piston 32 so that the hardness of the part of the piston 32 which will contact with the stopper member 51 is equal to or higher than the hardness of the stopper member 51, the reinforcing member 71 can prevent deformation of the piston 32 when the piston 32 strikes on the stopper member 51.

For example, the piston 32 may be made of stainless steel. However, when the piston 32 is made of aluminum and the part of the piston 32 which will contact with the stopper member 51 is attached with the reinforcing member 71 as in the above embodiment, this configuration can reduce a material cost for manufacturing the piston 32.

For example, the rotation locking member 68 and the tightening nut 218 may be omitted. However, when the rotation locking member 68 or the tightening nut 218 is provided, even if the piston 32 or the piston 232 repeatedly strikes on the stopper member 51 or 211, the stopper member 51 or 211 fixed to the rotation locking member 68 or the tightening nut 218 is less likely to be displaced. This configuration can maintain the full stroke constant.

REFERENCE SIGNS LIST

1, 201 Vacuum pressure proportional control valve
6 Cylinder
9 Rotation jig
15 Valve seat surface
21 Valve element
31 Piston chamber
32 Piston
51, 211 Stopper member
61 Adjusting unit
62 Housing groove
63 Contact member
64 Screw part
65 Engagement hole
66 Urging spring
68 Rotation locking member
214 Screw part
218 Tightening nut

What is claimed is:

1. A vacuum pressure proportional control valve to be placed on a pipe connecting a reaction vessel and a vacuum pump to control vacuum pressure in the reaction vessel, the vacuum pressure proportional control valve comprising:
    a cylinder including a piston chamber;
    a piston housed in the piston chamber so that the piston makes reciprocal linear movement;
    a valve seat;
    a valve element configured to contact with or separate from the valve seat according to movement of the piston;
    a stopper member placed in the cylinder and including a leading end portion placed inside the piston chamber, the stopper member being configured to place the vacuum pressure proportional control valve in a fully-open state when the leading end portion contacts with the piston; and
    an adjusting unit configured to move the stopper member back and forth in a moving direction of the piston to adjust a position of the leading end portion, wherein
    the adjusting unit comprises:
        a contact member placed in a part of the cylinder, the part being located on an opposite side to the valve seat, so that the contact member can contact with a rear end of the stopper member;
        an urging member urging the stopper member toward the contact member; and
        a screw part configured to move the contact member in the moving direction of the piston.

2. The vacuum pressure proportional control valve according to claim 1, wherein the stopper member includes a fixing member configured to fix the stopper member at any position.

3. The vacuum pressure proportional control valve according to claim 1, wherein a part of the piston which will contact with the stopper member has a hardness equal to or higher than a hardness of the stopper member.

4. The vacuum pressure proportional control valve according to claim 3, wherein the stopper member includes a fixing member configured to fix the stopper member at any position.

5. The vacuum pressure proportional control valve according to claim 1, wherein
    the contact member has annular shape,
    the part of the cylinder is formed with an annular housing groove configured to house therein the contact member,
    the screw part includes external threads formed on an outer peripheral surface of the contact member and internal threads formed on an inner peripheral surface of the housing groove, and
    the stopper member includes a plurality of stopper members arranged at equal intervals in a circumferential direction of the housing groove, and the urging member includes a plurality of urging members placed one for each of the stopper members, the stopper members being urged toward the contact member by the corresponding urging members.

6. The vacuum pressure proportional control valve according to claim 5, wherein the stopper member includes a fixing member configured to fix the stopper member at any position.

7. The vacuum pressure proportional control valve according to claim 5, wherein a part of the piston which will contact with the stopper member has a hardness equal to or higher than a hardness of the stopper member.

8. The vacuum pressure proportional control valve according to claim 7, wherein the stopper member includes a fixing member configured to fix the stopper member at any position.

9. The vacuum pressure proportional control valve according to claim 5, wherein the contact member includes a first surface located opposite a second surface contacting with the stopper member, the first surface being formed with a plurality of engagement holes arranged at equal intervals in a circumferential direction of the contact member and configured to allow a rotation jig for rotating the contact member to be engaged therewith.

10. The vacuum pressure proportional control valve according to claim 9, wherein the stopper member includes a fixing member configured to fix the stopper member at any position.

11. The vacuum pressure proportional control valve according to claim 9, wherein a part of the piston which will contact with the stopper member has a hardness equal to or higher than a hardness of the stopper member.

12. The vacuum pressure proportional control valve according to claim 11, wherein the stopper member includes a fixing member configured to fix the stopper member at any position.

* * * * *